United States Patent
Tanaka et al.

(10) Patent No.: US 7,668,606 B2
(45) Date of Patent: Feb. 23, 2010

(54) CONTROL DEVICE FOR CONTROLLING A CONTROL OBJECT AT A RATIO OF ON-TIME TO OFF-TIME FOR A TIME-PROPORTIONAL OUTPUT

(75) Inventors: Yoshio Tanaka, Musashino (JP); Nobuyuki Mori, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 213 days.

(21) Appl. No.: 11/653,369

(22) Filed: Jan. 16, 2007

(65) Prior Publication Data

US 2007/0185593 A1 Aug. 9, 2007

(30) Foreign Application Priority Data

Feb. 6, 2006 (JP) ............................. 2006-027845

(51) Int. Cl.
*G05B 13/02* (2006.01)
(52) U.S. Cl. ............................. 700/42; 700/29; 700/37
(58) Field of Classification Search .................. 700/37, 700/29, 42

See application file for complete search history.

(56) References Cited

FOREIGN PATENT DOCUMENTS

| JP | 62212803 A | * | 9/1987 |
|---|---|---|---|
| JP | 09119777 A | * | 5/1997 |
| JP | 2000-47703 A | | 2/2000 |
| JP | 2001022404 A | * | 1/2001 |

* cited by examiner

*Primary Examiner*—Albert DeCady
*Assistant Examiner*—Tejal Gami
(74) *Attorney, Agent, or Firm*—Westerman, Hattori, Daniels & Adrian, LLP

(57) ABSTRACT

There is realized a control device capable of speeding up an output response without causing deterioration in the resolution of a time-proportional output. The control device controls a control object at a ratio of ON-time to OFF-time for a time-proportional output. The control device comprises a PID computation unit for executing PID computation of deviation between a set value and a measured value from the control object, an integrator for sequentially adding up control output values each representing the result of the PID computation executed by the PID computation unit, an ON/OFF determination unit for determining whether the time-proportional output is turned ON or OFF on the basis of an integrated value of the integrator, and a time-proportional output unit for turning the time-proportional output ON/OFF on the basis of a determination value of the ON/OFF determination unit.

6 Claims, 6 Drawing Sheets

CONTROL DEVICE FOR CONTROLLING A CONTROL OBJECT AT A RATIO OF ON-TIME TO OFF-TIME FOR A TIME-PROPORTIONAL OUTPUT

FIELD OF THE INVENTION

The invention relates to a control device, and in particular, to a control device wherein an improvement is made on a time-proportional output for controlling a control target at a ratio of ON-time to OFF-time of a cycle time.

BACKGROUND OF THE INVENTION

With a control device such as temperature controllers, programmable logic controller, and so forth, a time-proportional output is used as one of outputting methods. With the time-proportional output, the magnitude of an output is expressed in terms of an ON-time ratio within a cycle time.

FIG. 5 is a block diagram showing a configuration of a conventional control device, and FIG. 6 is a diagram for describing an operation of a conventional time-proportional driver.

In FIG. 5, a control device 10 controls a control object 20 according to a ratio of ON-time to OFF-time of time-proportional output. A PID computation unit 11 executes PID computation of deviation between a set value SV and a measured value PV from the control object 20, thereby delivering a PID computation output as a control output value MV. A time-proportional driver 12 delivers a time-proportional output corresponding to the control output value MV to the control object 20 upon receiving the control output value MV.

In FIG. 6, 10 ms (in the case of 50 Hz) or 8.666 ms (in the case of 60 Hz), corresponding to one half of a commercial power supply cycle, is often selected as resolution of ON-time, and a cycle time is decided in consideration of a minuscule value expressed in terms of the control output value MV.

For example, in the case where a power supply of 50 Hz is in use, and the control output value MV is expressed by the step of 0.1% in a range of 0 to 100%, a cycle time of at least 10 s (1000 times 10 ms) is required in order to express the time-proportional output in terms of the same minuscule step. When the cycle time is set to 10 s, according to the time-proportional output with the control output value at 40%, the control device 10 is ON for 4 s (Ton), and is OFF for 6 s (Toff).

For example, in JP 2000-47703 A, there has been disclosed a time-proportional type control device capable of accurately and speedily providing a control object with results of output control for controlling the control object.

SUMMARY OF THE INVENTION

A cycle time needs to be lengthened in order that time-proportional output has a satisfactory resolution, however, in this case, a problem has been encountered in that output renewal is delayed, thereby causing response of a control system in whole to be deteriorated.

On the other hand, if the cycle time is shortened in order to speed up an output response, this has caused a problem in that the satisfactory resolution cannot be obtained.

The invention has been developed in order to resolve the problems described above, and it is therefore an object of the invention to realize a control device capable of speeding up an output response without causing deterioration in the resolution of a time-proportional output.

To that end, in accordance with one aspect of the invention, there is provided a control device for controlling a control object at a ratio of ON-time to OFF-time for a time-proportional output, said control device comprising a PID computation unit for executing PID computation of deviation between a set value and a measured value from the control object, an integrator for sequentially adding up control output values each representing the result of the PID computation executed by the PID computation unit, an ON/OFF determination unit for determining whether the time-proportional output is turned ON or OFF on the basis of an integrated value of the integrator, and a time-proportional output unit for turning the time-proportional output ON/OFF on the basis of a determination value of the ON/OFF determination unit.

The integrator preferably integrates the control output value renewed for every control cycle by adding the latest control output value thereto for every resolution cycle.

The resolution cycle preferably corresponds to one half of a commercial power supply cycle delivered to the control object.

The ON/OFF determination unit may determine the reciprocal of the resolution of the time-proportional output as a maximum value of a control output.

The ON/OFF determination unit may determine that the time-proportional output is ON if the integrated value exceeds the maximum value of the control output value.

The ON/OFF determination unit preferably subtracts the maximum value from the integrated value upon the integrated value exceeding the maximum value, thereby sending back the difference to the integrator.

The time-proportional output unit may turn the time-proportional output ON for one period of the resolution cycle if the ON/OFF determination unit makes an ON-determination.

The invention has advantageous effects as follows.

Output renewal and output response can be rendered faster by adding the latest control output value for every resolution cycle to the control output value renewed for every control cycle.

Further, even in the case where the output response is rendered faster, a portion of the integrated value, corresponding to arithmetic underflow, occurring due to the cycle time being shortened, continues to be integrated, and upon the sum of the portions coming to correspond in value to the resolution, the sum will be reflected on the output, thereby enabling the resolution of the output to be maintained.

BEST MODE FOR CARRYING OUT THE INVENTION

The invention is described in detail hereinafter with reference to the accompanying drawings.

Figure 1:
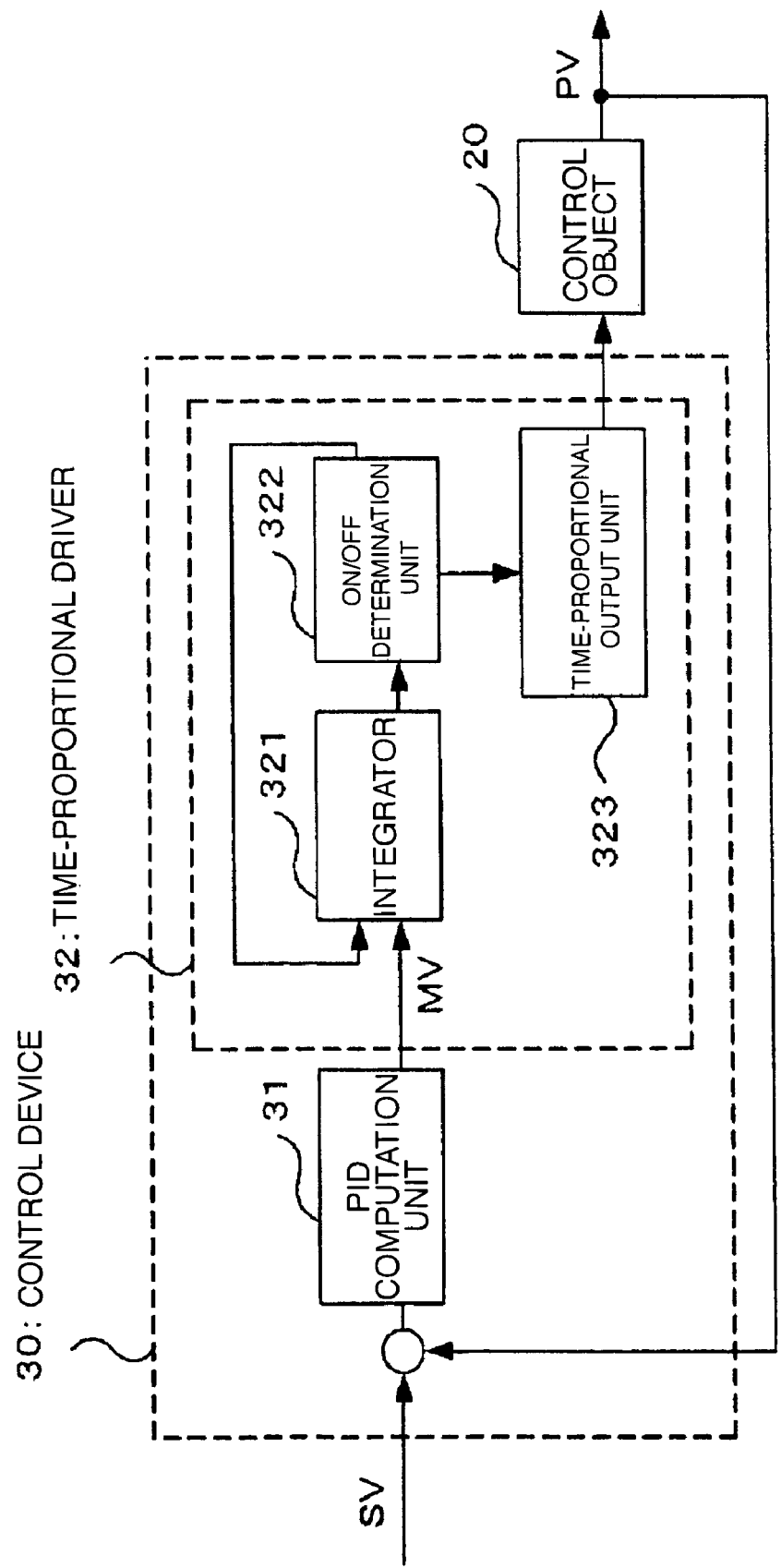
FIG. 1 is a block diagram showing one embodiment of a control device according to the invention.

FIG. 1 is a block diagram showing one embodiment of a control device according to the invention. In FIG. 1, parts corresponding to those in the previously-shown figure are denoted by like reference numerals.

In FIG. 1, a control device 30 controls a control object 20 according to a ratio of ON-time to OFF-time of time-proportional output. A PID computation unit 31 executes PID computation of deviation between a set value SV and a measured value PV from the control object 20, and a PID computation output is delivered as a control output value MV. A time-proportional driver 32 delivers the time-proportional output to the control object 20 upon receiving the control output value MV.

The time-proportional driver 32 comprises an integrator 321, an ON/OFF determination unit 322, and a time-proportional output unit 323.

The PID computation unit 31 executes the PID computation for every control cycle on the basis of the deviation between the set value SV and the measured value PV before outputting the control output value MV for every control cycle.

The integrator 321 sequentially integrates the control output value MV by adding the latest control output value MV for every resolution cycle.

The control cycle is a cycle in which the PID computation unit 31 executes the PID computation. Further, the measured value PV is fed back from the control object 20 to the control device 30 for every control cycle.

The resolution cycle is a cycle in which resolution of the time-proportional output for controlling the control object 20 is expressed in terms of time, representing a time period when the control object 20 can distinguish ON/OFF of the time-proportional output. For example, in the case of the control object 20 being temperature, ON/OFF of a heater is executed at the timing of zero-cross of a commercial power supply, so that 10 ms (in the case of 50 Hz), or 8.666 ms (in the case of 60 Hz), corresponding to one half of the cycle of the commercial power supply, is selected as the resolution cycle.

In this case, the control cycle need not be in sync with the resolution cycle, and even if the control cycle is asynchronous with the resolution cycle, an operation is enabled.

The ON/OFF determination unit 322 adopts a maximum value of the control output value MV as a determination criterion, and determines the reciprocal of the resolution of the time-proportional output as the maximum value of the control output value MV. For example, in the case of the resolution being at 0.1%, the maximum value will be 1000.

If an integrated value of the integrator 321 exceeds the maximum value of the control output value MV, the ON/OFF determination unit 322 determines that the time-proportional output is ON, thereby notifying an ON-determination to the time-proportional output unit 323.

If the time-proportional output unit 323 receives notification of the ON-determination from the ON/OFF determination unit 322, the time-proportional output unit 323 turns the time-proportional output ON during one cycle of the resolution cycle. The time-proportional output is controlled such that a ratio of OFF time to ON time is decided, and a cycle time undergoes variation such that the greater the control output value MV, the shorter the cycle time becomes while the smaller the control output value MV, the longer the cycle time becomes.

Figure 2:
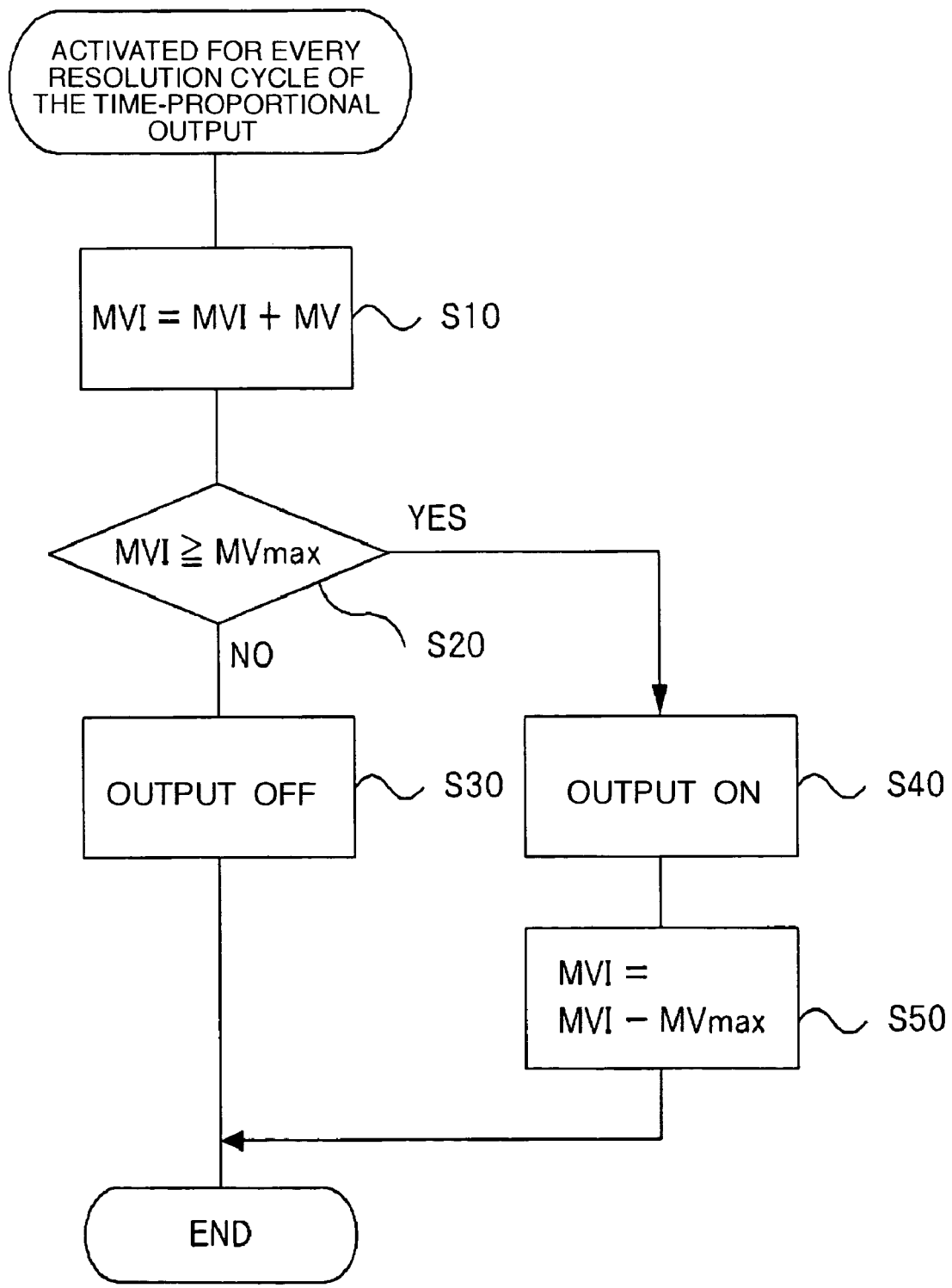
FIG. 2 is a flow chart showing an operation procedure for time-proportional output according to the invention.

FIG. 2 is a flow chart showing an operation procedure for the time-proportional output according to the invention.

In FIG. 2, the maximum value of a control output is designated as MVmax, and an integrated value obtained by adding up the control output values MV for every resolution cycle of the time-proportional output is designated as MV1.

The time-proportional driver 32 is activated for every resolution cycle of the time-proportional output. The integrator 321 adds up the control output values MV, each representing the result of the PID computation executed by the PID computation unit 31 for every resolution cycle (S10). The ON/OFF determination unit 322 compares the integrated value MV1 of the control output with the maximum value MVmax of the control output (S20), thereby determining whether the time-proportional output is to be turned ON or OFF.

If the integrated value MV1 of the control output is smaller than the maximum value MVmax of the control output, the ON/OFF determination unit 322 makes OFF-determination on the time-proportional output, according to which the time-proportional output unit 323 turns the time-proportional output OFF (S30). On the other hand, if the integrated value MV1 of the control output exceeds the maximum value MVmax of the control output, the ON/OFF determination unit 322 makes ON-determination on the time-proportional output, according to which the time-proportional output unit 323 turns the time-proportional output ON (S40).

If the integrated value MV1 of the control output exceeds the maximum value MVmax of the control output, the ON/OFF determination unit 322 subtracts the maximum value MVmax of the control output from the integrated value MV1 of the control output (S50), thereby sending back the difference as the integrated value MV1 of the control output to the integrator 321.

The integrator 321 continues to newly integrate the control output value MV to the difference (S10).

Figure 3:
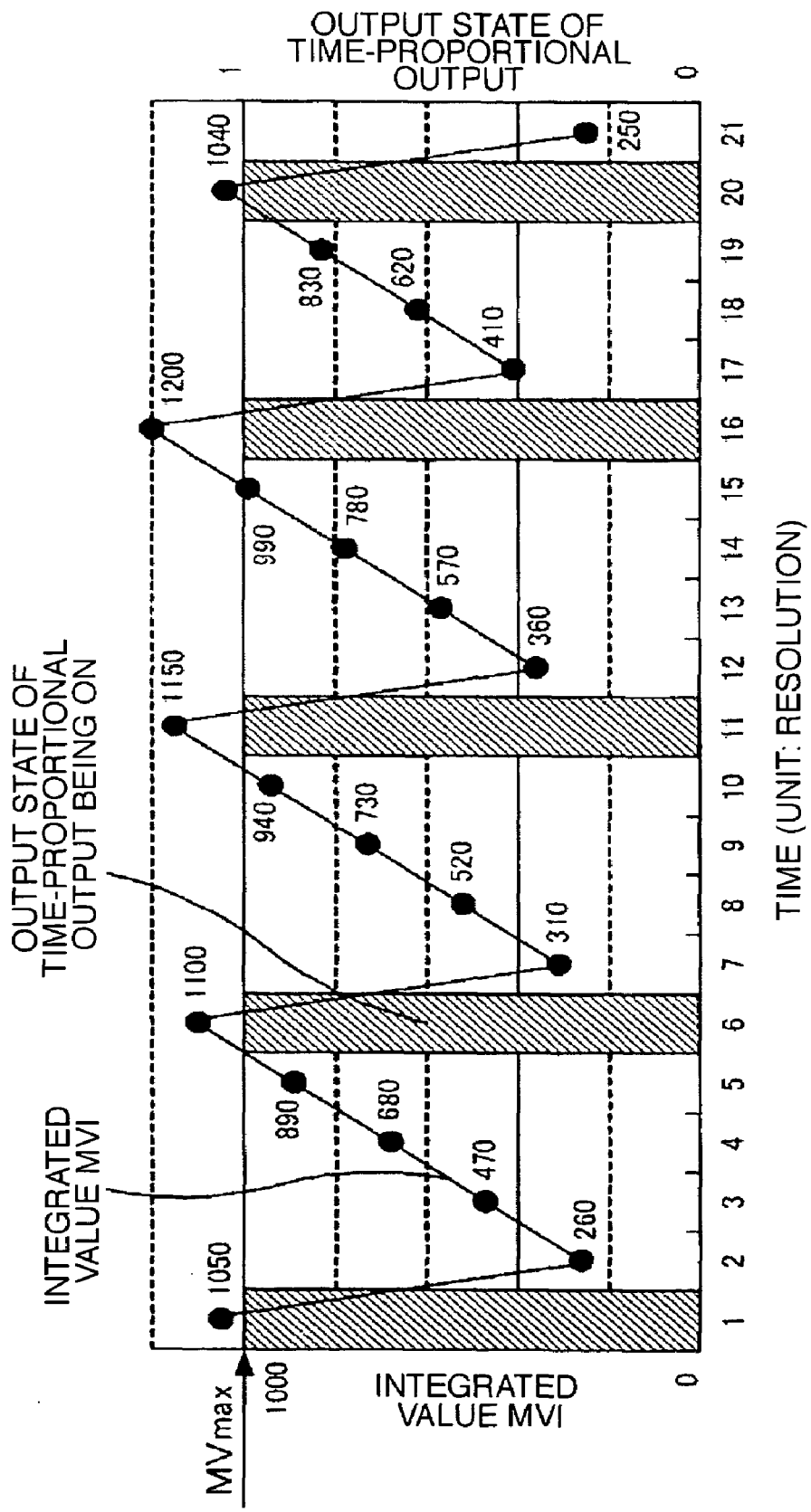
FIG. 3 is a diagram for describing an output state of the time-proportional output according to the invention.

FIG. 3 is a diagram for describing an output state of the time-proportional output according to the invention.

This represents the case of an operation on the assumption that the maximum value MVmax of the control output is 1000 (the resolution of the time-proportional output: 0.1%), and the control output value MV is 210 (an ON-time ratio: 21.0%), showing a relationship between the integrated value MV1 of the control output and the ON/OFF condition of the time-proportional output.

The integrated value MV1 is integrated by 210 for every unit time (the resolution cycle) starting from a time 2, thereby sequentially varying to 260, 470, 680, and 890, respectively. Since the integrated value MV1 is smaller than the maximum value MVmax during this period, the output state of the time-proportional output is OFF.

Since the integrated value MV1 reaches 1100 at a time 6, and the integrated value MV1 exceeds the maximum value MVmax, the output state of the time-proportional output is ON.

The control output value MV (210) is added to a value (100) obtained by subtracting the maximum value MVmax (1000) from 1100, so that the integrated value MV1 at a time 7 reaches 310.

Thereafter, ON-OFF determination, and subtraction at the ON-time are similarly repeated.

In the case of the resolution of the time-proportional output being 0.1%, a cycle time for a conventional resolution cycle at 10 ms used to be 10 s, however, with the embodiment of the invention, a cycle time for the resolution cycle at 10 ms becomes 50 ms (the time 2 to the time 6), so that a renewed cycle becomes shorter, thereby enabling an output response to become faster.

In this case, a portion of the integrated value MV1, corresponding to arithmetic underflow, occurring due to the cycle time being shortened, continues to be integrated, and upon the sum of the portions coming to correspond in value to the resolution, the sum will be reflected on the time-proportional output. More specifically, in a range of the time 2 to the time 6, the ON-time ratio is 1/5, that is, 20% of an output, and in a range of a time 7 to a time 11, and in a range of a time 12 to a time 16, the ON-time ratio is similarly 20% of the output, smaller than the ON-time ratio at 21.0% for the control output value MV.

In contrast, in a range of a time 17 to a time 20, the ON-time ratio is 1/4, that is, 25% of the output, greater than the ON-time ratio at 21.0% for the control output value MV, thereby causing the cycle time to undergo a change.

Thus, with the control device according to the embodiment of the invention, the resolution can be maintained because of a mechanism for integrating the portion of the integrated value MV1, corresponding to the arithmetic underflow, across a plurality of cycles (cycle times), so that output-ON time proportional to the control output value MV can be obtained throughout the operation.

As an output form that is speedy in response and is of a high resolution, there is available an outputting method using a thyristor, however, with this method, there has been encountered a case where the characteristic of a control system in whole undergoes a change depending on an operation point because it is difficult to establish a linear relationship between a control output value MV, and an actual output. In contrast, with the invention, it is always possible to obtain an output proportional to the output value MV.

Figure 4:
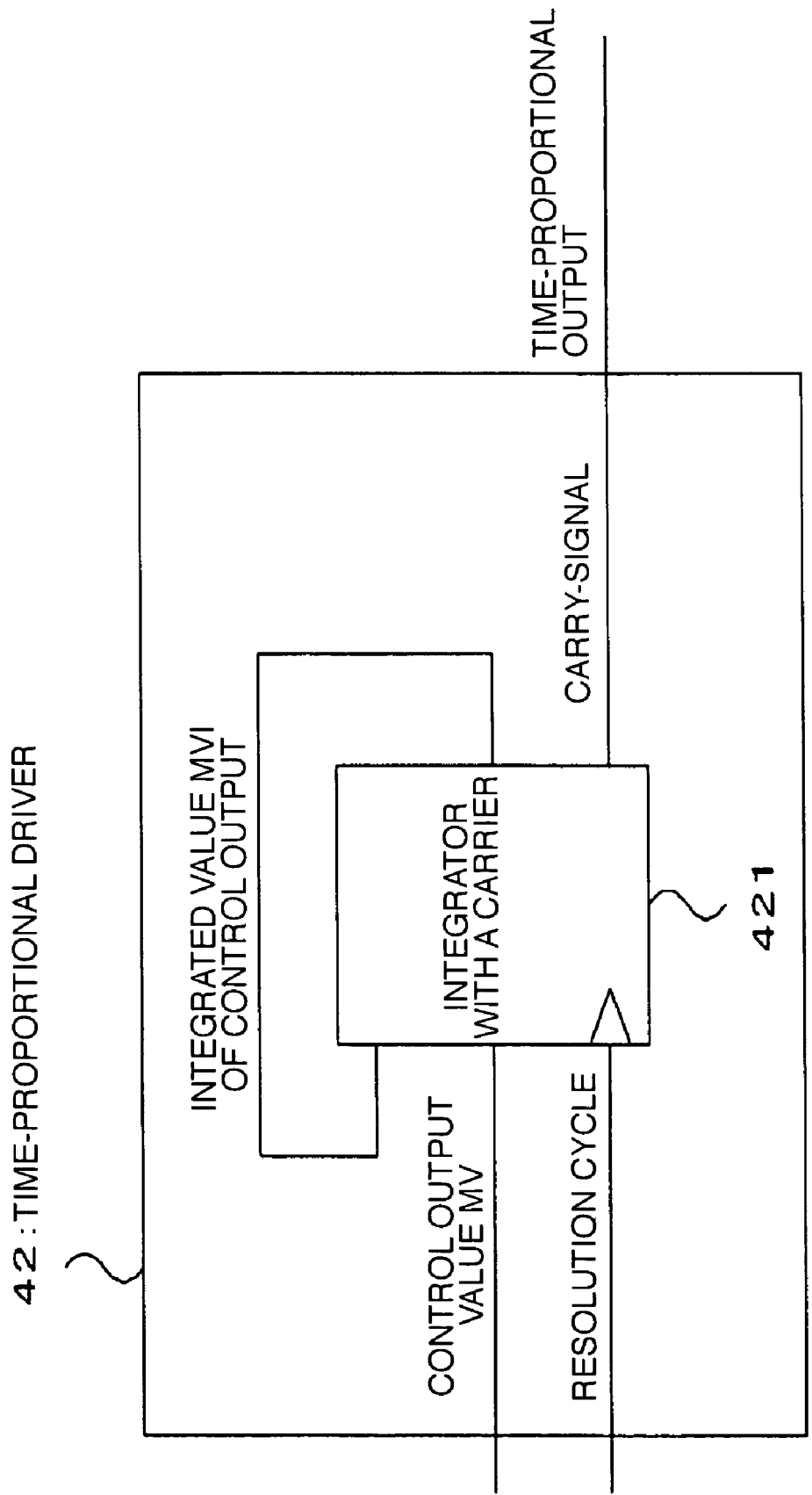
FIG. 4 is a view showing another embodiment of a control device according to the invention.
Figure 5:
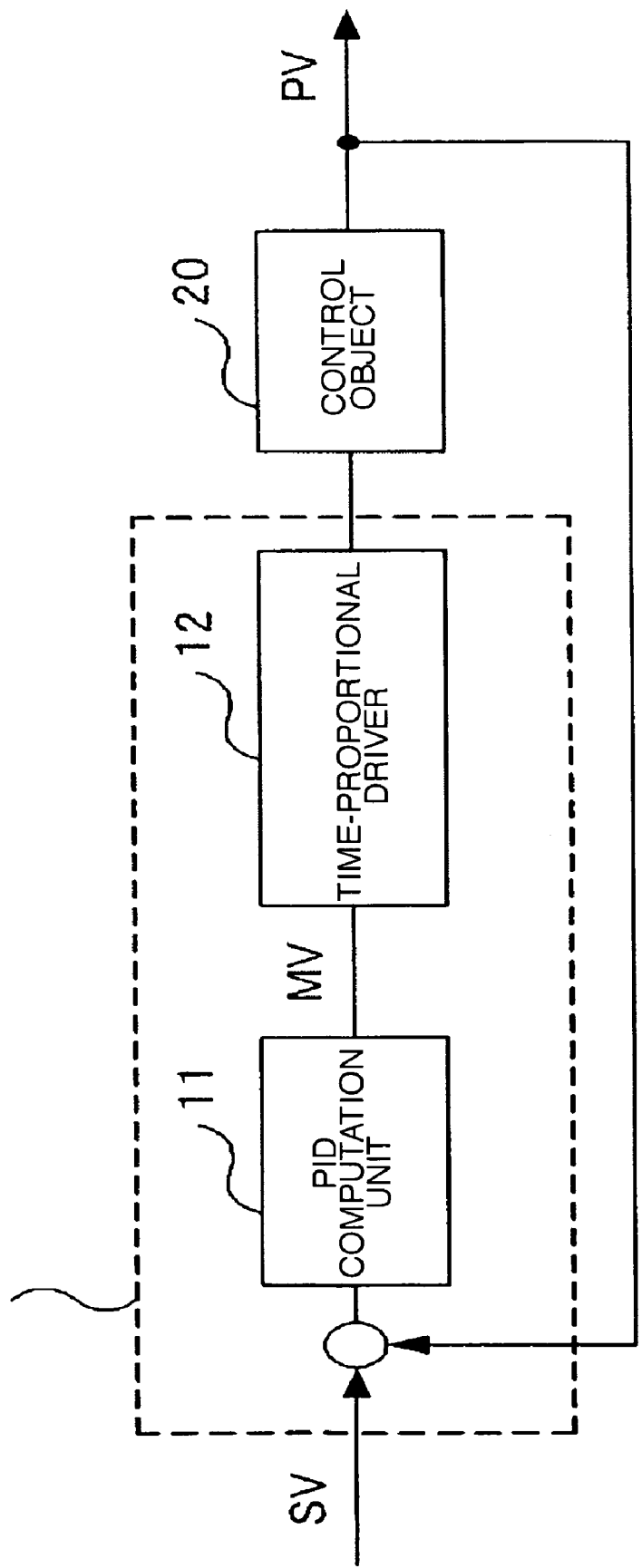
FIG. 5 is a block diagram showing the configuration of a conventional control device.
Figure 6:
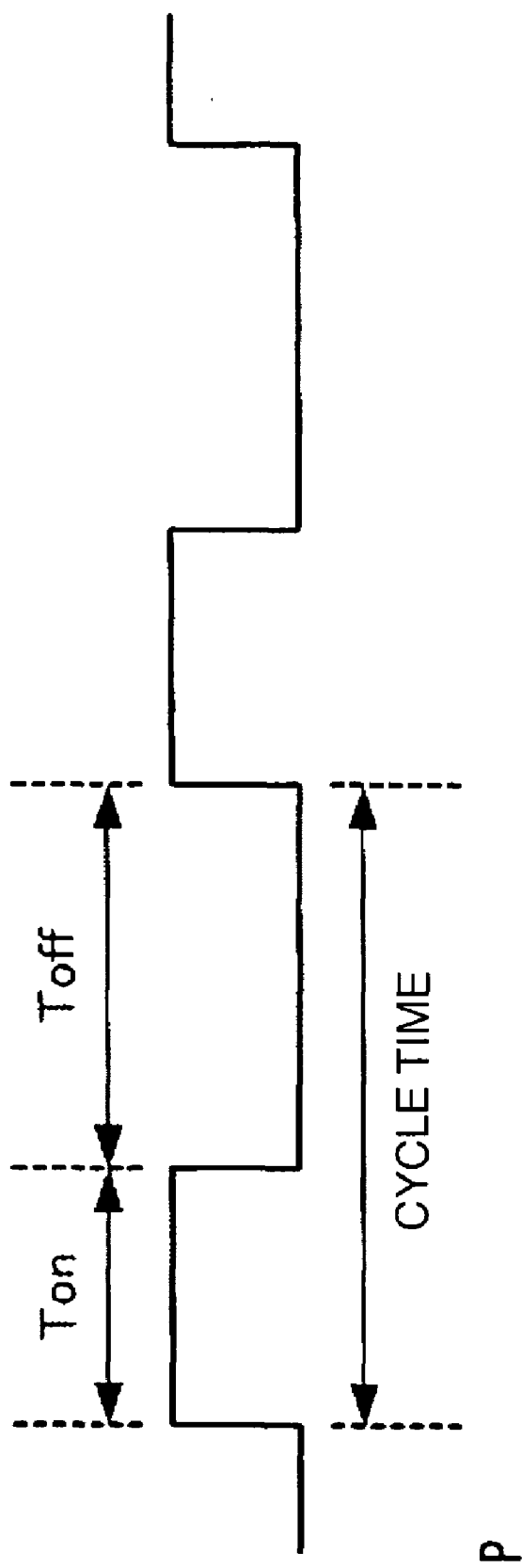
FIG. 6 is a diagram for describing an operation of a conventional time-proportional driver.

FIG. 4 is a view showing another embodiment of a control device according to the invention.

There is shown an example where a time-proportional driver 42 is made up of an ASIC.

An integrator 421 with a carrier is an adder for integrating (adding up) an output value MV in a given cycle (resolution cycle). The integrator 421 with the carrier has an upper limit equivalent to a maximum value MVmax of a control output, asserting a carry-signal at the time of an integrated value overflowing. The carry-signal causes a time-proportional output to turn ON. Further, a procedure is repeated whereby the maximum value MVmax of the control output is subtracted from the integrated value, and the output value MV is added to the difference obtained.

Thus, fast output response can be effected by rendering the cycle time shorter.

Meanwhile, as for the resolution to be affected due to the cycle time being shortened, the portion of the integrated value, corresponding to the arithmetic underflow, and not represented, is integrated, and upon the sum of the portions coming to correspond in value to the resolution, the sum can be reflected on the output, so that a satisfactory resolution can be implemented as a whole.

It is therefore possible to achieve a time-proportional output wherein fast output response can be compatible with the satisfactory resolution.

What is claimed is:

1. A control device for controlling a control object at a ratio of ON-time to OFF-time for a time-proportional output, said control device comprising:
   a PID computation unit executing PID computation of deviation between a set value and a measured value from the control object, an integrator sequentially adding up control output values each representing the result of the PID computation executed by the PID computation unit, wherein an input of said integrator is directly connected to an output of said PID computation unit;
   an ON/OFF determination unit determining whether the time-proportional output is turned ON or OFF on the basis of an integrated value of the integrator, wherein an input of said ON/OFF determination unit is directly connected to an output of the integrator, wherein the integrator integrates the control output value renewed for every control cycle by adding the latest control output value thereto for every resolution cycle, and wherein the resolution cycle corresponds to one half of a commercial rower supply cycle delivered to the control object; and
   a time-proportional output unit turning the time-proportional output ON/OFF on the basis of a determination value of the ON/OFF determination unit; and
   wherein an input of the time-proportional output unit is directly connected to an output of the ON/OFF determination unit.

2. The control device according to claim 1, wherein the ON/OFF determination unit determines the reciprocal of the resolution of the time-proportional output as a maximum value of a control output.

3. The control device according to claim 2, wherein the ON/OFF determination unit determines that the time-proportional output is ON if the integrated value exceeds the maximum value of the control output value.

4. The control device according to claim 2, wherein the ON/OFF determination unit subtracts the maximum value from the integrated value upon the integrated value exceeding the maximum value, thereby sending back the difference to the integrator.

5. The control device according to claim 1, wherein the time-proportional output unit turns the time-proportional output ON for one period of the resolution cycle if the ON/OFF determination unit makes an ON-determination.

6. A control device for controlling a control object at a ratio of ON-time to OFF-time for a time-proportional output, said control device comprising:
   a PID computation unit executing PID computation of deviation between a set value and a measured value from the control object, an integrator sequentially adding up control output values each representing the result of the PID computation executed by the PID computation unit, wherein an input of said integrator is directly connected to an output of said PID computation unit;
   a time-proportional output unit turning the time-proportional output ON/OFF on the basis of a determination value of the ON/OFF determination unit;
   wherein said integrator receives a control output value from the PID computation unit, and said integrator also receives a resolution cycle input, and wherein said integrator outputs a carry signal to the time proportional output unit, wherein the integrator integrates the control output value renewed for every control cycle by adding the latest control output value thereto for every resolution cycle, and wherein the resolution cycle corresponds to one half of a commercial power supply cycle delivered to the control object.

* * * * *